United States Patent
Wang et al.

(10) Patent No.: US 10,929,162 B2
(45) Date of Patent: Feb. 23, 2021

(54) VIRTUAL MACHINE CONTAINER FOR APPLICATIONS

(71) Applicant: Futurewei Technologies, Inc., Plano, TX (US)

(72) Inventors: Haichuan Wang, San Jose, CA (US); Chao Wang, Hangzhou (CN); Wei Tang, Hangzhou (CN); Fei Yang, Hangzhou (CN); Kai-Ting Amy Wang, Toronto (CA); Man Pok Ho, Toronto (CA)

(73) Assignee: Futurewei Technologies, Inc., Plano, TX (US)

( * ) Notice: Subject to any disclaimer, the term of this patent is extended or adjusted under 35 U.S.C. 154(b) by 131 days.

(21) Appl. No.: 16/047,273

(22) Filed: Jul. 27, 2018

(65) Prior Publication Data
US 2020/0034166 A1   Jan. 30, 2020

(51) Int. Cl.
G06F 9/455   (2018.01)
G06F 9/48   (2006.01)
G06F 9/50   (2006.01)

(52) U.S. Cl.
CPC .......... *G06F 9/45533* (2013.01); *G06F 9/455* (2013.01); *G06F 9/48* (2013.01); *G06F 9/4806* (2013.01); *G06F 9/4856* (2013.01); *G06F 9/4881* (2013.01); *G06F 9/50* (2013.01); *G06F 9/5083* (2013.01); *G06F 9/5088* (2013.01); *G06F 2009/4557* (2013.01);
(Continued)

(58) Field of Classification Search
CPC ... G06F 9/455; G06F 9/48; G06F 9/50; G06F 9/45504; G06F 9/45533; G06F 9/45558; G06F 2009/45562; G06F 2009/4557; G06F 2009/45575; G06F 2009/45579; G06F 2009/45583; G06F 2009/45587; G06F 9/4806; G06F 9/4843; G06F 9/4856; G06F 9/4881; G06F 9/5083; G06F 9/5088
See application file for complete search history.

(56) References Cited

U.S. PATENT DOCUMENTS

| 6,931,544 | B1 | 8/2005 | Kienhoefer |
| 8,966,464 | B1 | 2/2015 | Christopher et al. |
| 9,606,822 | B2 * | 3/2017 | Hunt ................... G06F 9/45558 |

(Continued)

FOREIGN PATENT DOCUMENTS

| CN | 107770298 A | 3/2018 |
| EP | 3179697 A1 | 6/2017 |

OTHER PUBLICATIONS

"International Application No. PCT/CN2019/095637, International Search Report and Written Opinion dated Oct. 22, 2019", (dated Oct. 22, 2019), 9 pgs.

(Continued)

*Primary Examiner* — Charles M Swift
(74) *Attorney, Agent, or Firm* — Schwegman Lundberg & Woessner, P.A.

(57) ABSTRACT

A computer implemented method manages execution of applications within a memory space of a multi-tenant virtual machine (MVM). The method includes instantiating a container for an application. The container has a thin client and a name space that is part of a memory space of the MVM. Threads of the application are moved from the MVM to the container. The threads are executed using the thin client in the name space of the container.

23 Claims, 6 Drawing Sheets

(52) U.S. Cl.
CPC .............. *G06F 2009/45562* (2013.01); *G06F 2009/45579* (2013.01); *G06F 2009/45587* (2013.01)

(56) References Cited

U.S. PATENT DOCUMENTS

| | | | |
|---|---|---|---|
| 9,703,611 | B1 | 7/2017 | Christopher et al. |
| 2005/0262512 | A1 | 11/2005 | Schmidt et al. |
| 2012/0204186 | A1* | 8/2012 | Davidson, II ......... G06F 9/4881 718/104 |
| 2013/0263123 | A1* | 10/2013 | Zhou ................... G06F 9/45504 718/1 |
| 2016/0371127 | A1* | 12/2016 | Antony ............... G06F 9/45558 |
| 2017/0091057 | A1 | 3/2017 | Ramasubramaniam et al. |
| 2017/0373940 | A1 | 12/2017 | Shahab et al. |
| 2018/0157517 | A1* | 6/2018 | Dong .................. G06F 9/45558 |
| 2018/0357086 | A1* | 12/2018 | Kinsella ................. H04L 49/70 |
| 2019/0324786 | A1* | 10/2019 | Ranjan ..................... G06F 8/60 |
| 2020/0034167 | A1* | 1/2020 | Parthasarathy ..... G06F 9/45558 |

OTHER PUBLICATIONS

"Waratek Cloud VM for Java", Technical Architecture Overview, White Paper No. 12062400, (Jun. 2012), 9 pgs.

Czajkowski, Grzegorz, et al., "Multitasking Without Compromise: A Virtual Machine Evolution", OOPSLA '01 Proceedings of the 16th ACM SIGPLAN conference on Object-oriented programming, systems, languages, and applications, Tampa Bay, FL, USA—Oct. 14-18, 2001; published in ACM SIGPLAN Notices, vol. 36, Issue 11, (Nov. 1, 2001), 125-138.

Johnson, Graeme, et al., "Introduction to Java multitenancy: Learn about a new feature for cloud systems in the IBM SKD Java Technology Edition, Version 7 Release 1", DeveloperWORKS, IBM Corporation, (Sep. 17, 2013), 7 pgs.

* cited by examiner

VIRTUAL MACHINE CONTAINER FOR APPLICATIONS

TECHNICAL FIELD

The present disclosure is related to the handling of applications by virtual machines and in particular to the use of containers on virtual machines to run applications.

BACKGROUND

Microservices are commonly used to develop online applications. Compared with applications written as monolithic structured code, the use of microservices to write applications can provide better application modularity and can be easier to understand, develop, and test. The use of microservices to perform small portions of functionality of a larger application can simplify development since each microservice is much smaller that the entire application.

An individual microservice can also be dynamically scaled. Microservices make it easy to upgrade and individual service and perform failure isolation.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a computer implemented method manages execution of applications within a memory space of a multi-tenant virtual machine (MVM). The method includes instantiating a container for an application. The container has a thin client and a name space that is part of a memory space of the MVM. Threads of the application are moved from the MVM to the container. The threads are executed using the thin client in the name space of the container.

Optionally, in any of the preceding aspects, a further implementation of the aspect includes launching threads for a first one of the applications within the MVM prior to moving the threads to the container.

Optionally, in any of the preceding aspects, a further implementation of the aspect includes wherein the thin client obtains a container ID and provides the container ID to the MVM.

Optionally, in any of the preceding aspects, a further implementation of the aspect includes wherein executing the threads within the name space of the first container includes handling input/output redirect between the MVM and the thin client.

Optionally, in any of the preceding aspects, a further implementation of the aspect includes wherein the MVM derives the container name space based on the container ID.

Optionally, in any of the preceding aspects, a further implementation of the aspect includes wherein moving the launched threads comprises moving the thread launched threads into the name space of the container.

Optionally, in any of the preceding aspects, a further implementation of the aspect includes wherein the MVM comprises a JAVA MVM and wherein moving the threads to the first container comprises transferring application jar files to the container.

Optionally, in any of the preceding aspects, a further implementation of the aspect includes instantiating a second container using the MVM, the second container having a name space that is within a memory space of the MVM, launching second threads for a second application within the MVM, moving the second launched threads to the second container, and executing the threads within the name space of the second container.

Optionally, in any of the preceding aspects, a further implementation of the aspect includes instantiating a third container using the MVM, the third container having a name space that is within a memory space of the MVM, launching third threads for a third application within the MVM, moving the third launched threads to the third container, and executing the third launched threads within the name space of the third container.

Optionally, in any of the preceding aspects, a further implementation of the aspect includes wherein the applications comprise microservices forming an application.

According to one aspect of the present disclosure, a device includes a memory storage comprising instructions and one or more processors in communication with the memory. The one or more processors execute the instructions to manage execution of applications within a memory space of a multi-tenant virtual machine (MVM) by performing operations. The operations include instantiating a container for an application. The container has a thin client and a name space that is part of a memory space of the MVM. Threads of the application are moved from the MVM to the container. The threads are executed using the thin client in the name space of the container.

Optionally, in any of the preceding aspects, a further implementation of the aspect includes launching threads for a first one of the applications within the MVM prior to moving the threads to the container.

Optionally, in any of the preceding aspects, a further implementation of the aspect includes wherein the thin client obtains a container ID and provides the container ID to the MVM, wherein the MVM derives the container name space based on the container ID, and wherein executing the threads within the name space of the first container includes handling input/output redirect between the MVM and the thin client.

Optionally, in any of the preceding aspects, a further implementation of the aspect includes instantiating a second container using the MVM, the second container having a name space that is within a memory space of the MVM, launching threads for a second one of the applications within the MVM, moving the second thread launched threads to the second container, and executing the threads within the name space of the second container.

Optionally, in any of the preceding aspects, a further implementation of the aspect includes wherein the MVM comprises a JAVA MVM and wherein moving the threads to the container comprises transferring application jar files to the container.

Optionally, in any of the preceding aspects, a further implementation of the aspect includes wherein the applications comprise microservices forming an application.

According to one aspect of the present disclosure, a non-transitory computer-readable media storing computer instructions for managing execution of applications within a memory space of a multi-tenant virtual machine (MVM). The instructions may be executed by one or more processors to perform operations including instantiating a container for an application. The container has a thin client and a name space that is part of a memory space of the MVM. Threads of the application are moved from the MVM to the container. The threads are executed using the thin client in the name space of the container.

Optionally, in any of the preceding aspects, a further implementation of the aspect includes launching threads for a first one of the applications within the MVM prior to moving the threads to the container, wherein the thin client obtains a container ID and provides the container ID to the MVM, wherein the MVM derives the container name space based on the container ID, and wherein executing the threads within the name space of the first container includes handling input/output redirect between the MVM and the thin client.

Optionally, in any of the preceding aspects, a further implementation of the aspect includes instantiating a second container using the MVM, the second container having a name space that is within a memory space of the MVM, launching second threads for a second application within the MVM, moving the second launched threads to the second container, and executing the second launched threads within the name space of the second container.

Optionally, in any of the preceding aspects, a further implementation of the aspect includes wherein the applications comprise microservices forming an application.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Applications written using a microservice based architecture result in many individual functions of an application being performed by different microservice applications. For example, in a web-based sales application, a login function may be performed by one microservice, a buy function may be performed by another microservice, and an address check by yet another microservice. By breaking down the application into microservices, development of the application becomes easier.

JAVA is a language often used to develop online business applications. There are several frameworks developed to help build microservice based systems in JAVA, like Spring Cloud, Netflix/eureka, Huawei internal CSE, and an open source version of Huawei CSE-Apache ServiceComb for example. JAVA application are just one example of applications designed to run on top of a language virtual machine, such as a JAVA virtual machine (JVM). Applications written for other types of language virtual machines are within the scope of the present inventive subject matter. A language VM is a virtual machine designed to execute a particular language.

JAVA applications traditionally use more processing resource memory due to the heavy base of a JVM. Each JAVA microservice instance is a JAVA process that requires the JVM, which includes components like a class loader, JAVA just in time compiler (JIT), garbage collection (GC), etc. As each microservice service becomes smaller, it is still an individual process in a container, and has one JVM on top of an operating system running on a virtual machine. A container is a portable runtime environment which runs on a host machine or virtual machine. An application or process which runs in a container is packaged with all the required dependencies and configuration files. The application is given the illusion that there are no other processes running outside of its container. The ratio between JVM base part memory usage to application memory usage becomes much larger. As a result, JAVA microservice applications use much more memory than the equivalent monolithic application.

The naive way to solve the problem is to merge microservices back to the monolithic application, which results in a loss of all the benefits of using microservices. Another industry solution to address the issue is to use a multi-tenant virtual machine (MVM), multi-tenant JVM (Like Webcontainer Tomcat/Websphere, IBM J9 MVM, etc.), which allows running multiple applications on top of one JVM to reduce the memory use. However, most current JAVA microservice Applications are deployed inside a container. Existing MVMs cannot run applications inside a container on top of an MVM. In addition, the source code of the microservices may need to be modified to avoid a conflict resulting from mapping to the same resource, such as the same port.

Figure 1:
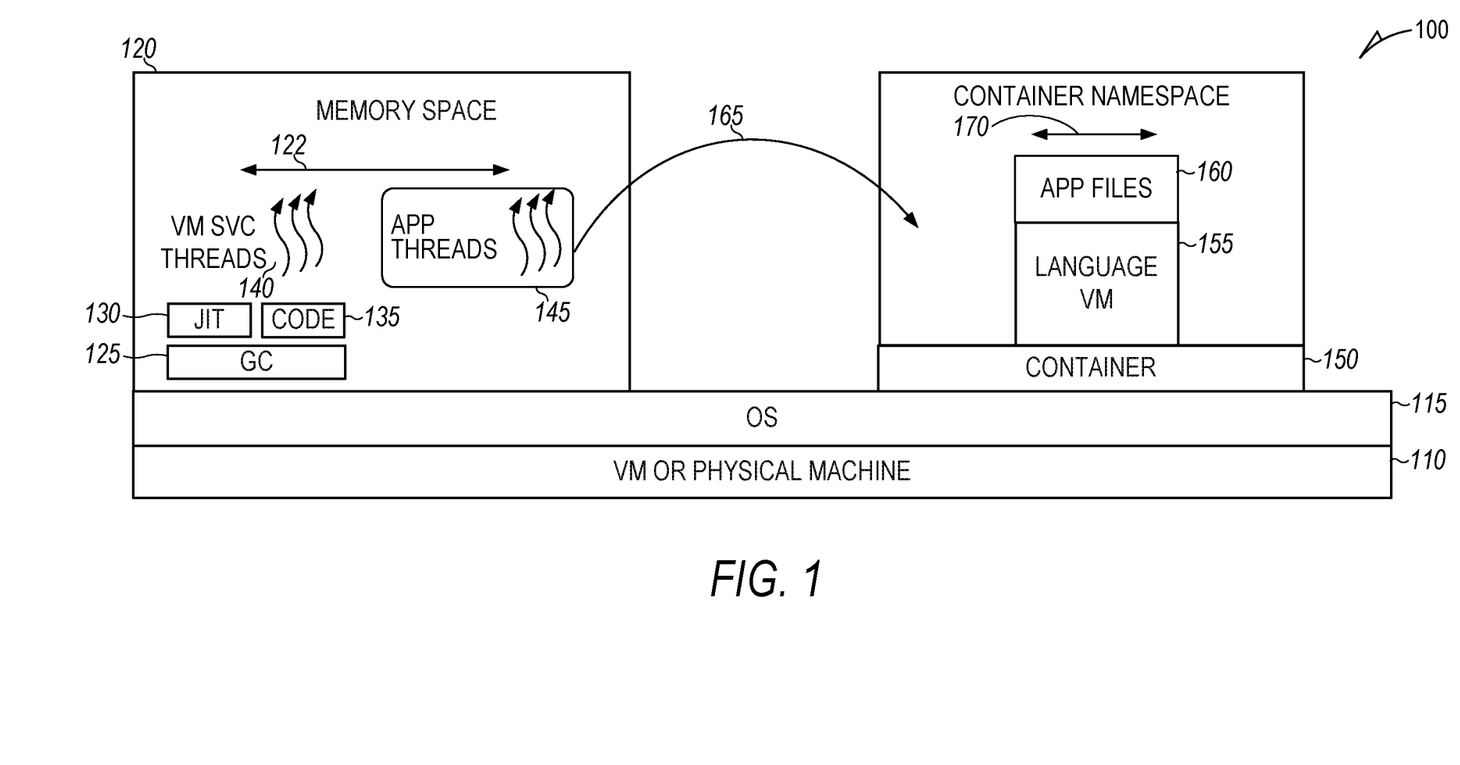
FIG. 1 is a block diagram illustrating a system that provides container capability for applications according to an example embodiment.

In one embodiment, container capability is provided inside a JVM. FIG. 1 is a block diagram illustrating a system 100 that provides container capability for applications, such as microservices. In one embodiment, system 100 includes a machine 110 which may be a physical machine or a virtual machine executing on suitable processing resources, such as a computer system, server, or cloud-based resources. An operating system 115 executes on top of the virtual machine 110. In one embodiment, Linux OS may be used as the operation system 115. Another virtual machine 120, such as a JVM (JAVA virtual machine), executes on top of the operating system 115. Oracle's production JVM may be used for example. While various embodiments are described using JAVA based applications, other operating environments and programming languages for applications that run on virtual machines may be used in further embodiments.

Language VM 120 includes a memory space 122 in which application code, such as microservices executing on language VM 120 operates. Example code includes garbage collection 125, JIT 130, other code 135, virtual machine service (VM SVC) threads 140, and application threads 145. Application threads 145 comprise microservices in one embodiment. The microservices may be referred to as tenant applications that make up an application. A single application running on a language VM is usually not referred to as a tenant application, while multiple applications running on the same language VM are referred to as tenant applications. An application may include a complete application or may be used to refer to an application consisting of multiple applications, such as microservices.

For execution of the application threads 145, a container 150 is instantiated by a container engine as a container instance on the operating system 115. In one embodiment, the container engine is a Docker container engine that provides a lightweight Linux container. A language VM 155, such as a JVM, is created in the container 150, and app files 160, such as app jar files, and application threads 145 are transferred to the container 150 as represented by arrow 165 for execution.

The container 150 relies on the operating system 115 name space capability. A name space is a set of symbols that are used to organize objects of various kinds, so that these objects may be referred to by name. Example name spaces include file systems that assign names to files, programming languages that organize variables and subroutines in name spaces and computer networks and distributed system that assign names to resources, such as computers, printers, websites, remote files, etc. Each container instance has its own name space 170 that is within memory space 122 creating lightweight virtualization and isolation capabilities. After the container 150 launches, the application threads 145 are created inside the language VM and moved into the name space of the container 150. These threads will run the app files 160 inside the container 150 and can still work with the language VM service threads 140 in the language VM 120, because all the threads are still in the same process memory space 122. A jar (JAVA ARchive) is a JAVA package file format typically used to aggregate many JAVA class files and associated metadata and resources (text, images, etc.) into one file for distribution. Application files 160 is basically the application code, whether written in JAVA or another programming language that is run in a virtualized machine inside the container 150.

System 100 transparently runs applications, such as JAVA applications, inside the container 150 on top of an MVM in one embodiment, saving memory as well as providing for transparent deployment.

A standalone application, such as a JAVA application, in one embodiment may be composed by classes and instances in memory, and the execution starts from the defined main class's main ( ) method. Because JAVA provides the class loader mechanism, a tenant class loader may be used to load the main class of the application and all the subsequent codes all live in the class loader's confinement and achieve the tenant code isolation. Other class loaders may be used for applications written in other languages.

Figure 2:
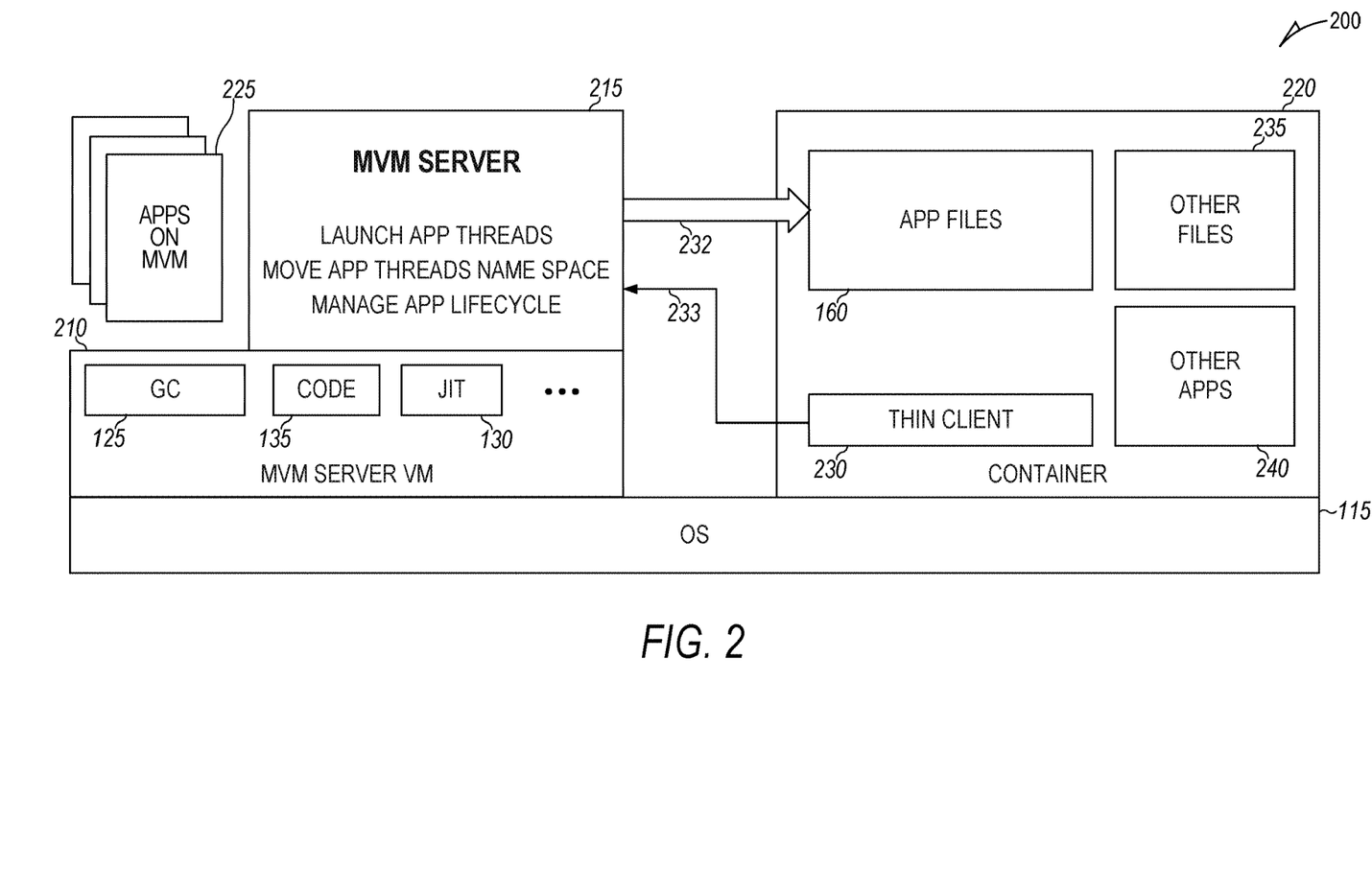
FIG. 2 is a block diagram illustrating an alternative view of a system providing container capability for applications according to an example embodiment.

FIG. 2 is a block diagram illustrating an alternative view of a system 200 providing container capability for applications. Reference numbers are repeated from FIG. 1 for like components in FIG. 2. An MVM server VM 210 runs GC 125, JIT 130, and code 135 in addition to MVM server code 215 that launches application threads, moves application threads into a container 220 name space, and manages application lifecycle. Multiple applications 225 are illustrated as associated with the MVM server language VM 210 and are managed by the MVM servers 215 to run in container 220 in the MVM memory space, utilizing the container 220 name space.

Container 220 runs an application using a thin client 230, such as a JAVA thin client in one example. An application developer will use the thin client 230 to launch the application. All the regular arguments will remain the same. The MVM server 215 will move application threads 145 into the containers name space and run the applications as indicated by arrow 232. After the thin client 230 receives the arguments, client 230 will send the arguments via connection 233 to the MVM server 215. Container 220 may also contain other files 235 and other applications 240 in some embodiments.

The MVM server will create application threads 145, such as JAVA applications, and move the application threads 145 into the name space of the container 220. The application threads 145 can then access the jar files 160 inside the container 220, load them and execute the "main( )" function from the start. Because all the execution behaviors are inside the name space of the container 220, the launched application can seamlessly interact with all the resources/other applications inside the container using one or more communication protocols, such as inter-process communication protocols. On the other hand, because all the threads are in the same memory space, threads can interact with each other. For example, JIT 130 can still generate codes for hot methods used by the application, and GC 125 can still clean garbage generated by the application.

Figure 3:
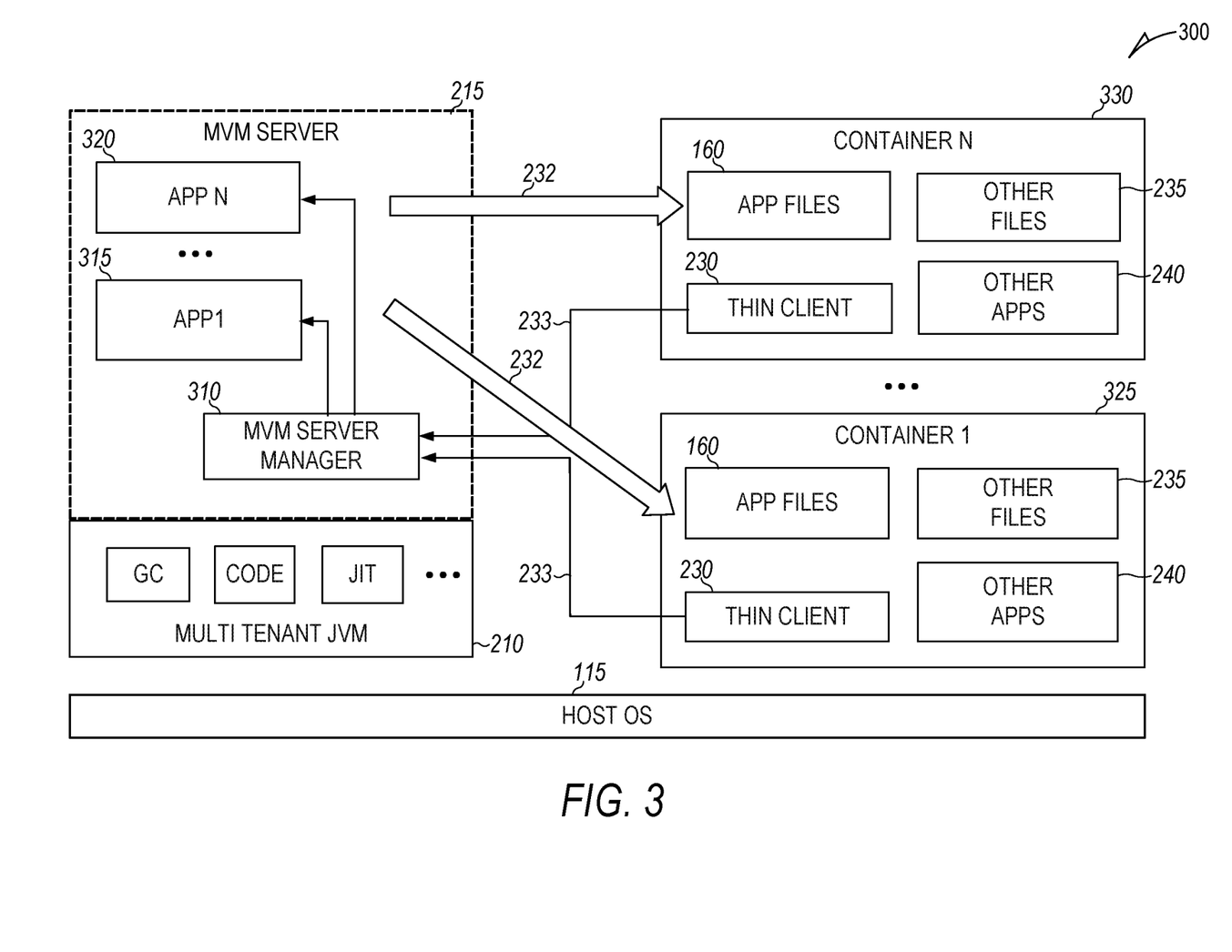
FIG. 3 is a block diagram illustrating several containers with application files according to an example embodiment.

FIG. 3 is a block diagram illustrating several containers with application files generally at 300. Reference numbers from previous figures are used for like elements. MVM server 215 includes an MVM server manager 310 that manages execution of multiple applications, indicated as APP1 315 and APPN 320 by instantiating a separate container 325, 330 respective for each application. Each container 325, 330 instance has its own name space, resulting in lightweight virtualization and isolation capabilities.

After a container launches as indicated by arrows 232, application threads inside the VM are moved into the name space of the application container 325, 330. These application threads will access the app jar files inside the container 325, 330 and work with the VM service threads in the MVM 210, because all the threads are still in the same process memory space.

The MVM server 215 executes on top of MVM 210 and manages each application's life cycle when an application is launched. The MVM server creates a new tenant in response to a request from the thin client 230, moving the tenant's worker threads into the container instance's name space, and setting all the OS related resource configurations. For example, the tenant's standard input and output are wrapped, and connected to the thin client in the container 325, 330. Wrapping of inputs and outputs may be used to identify how the input and output are to be opened or otherwise handled. When the tenant quits, the MVM server 215 also does the resource cleaning work.

Figure 4:
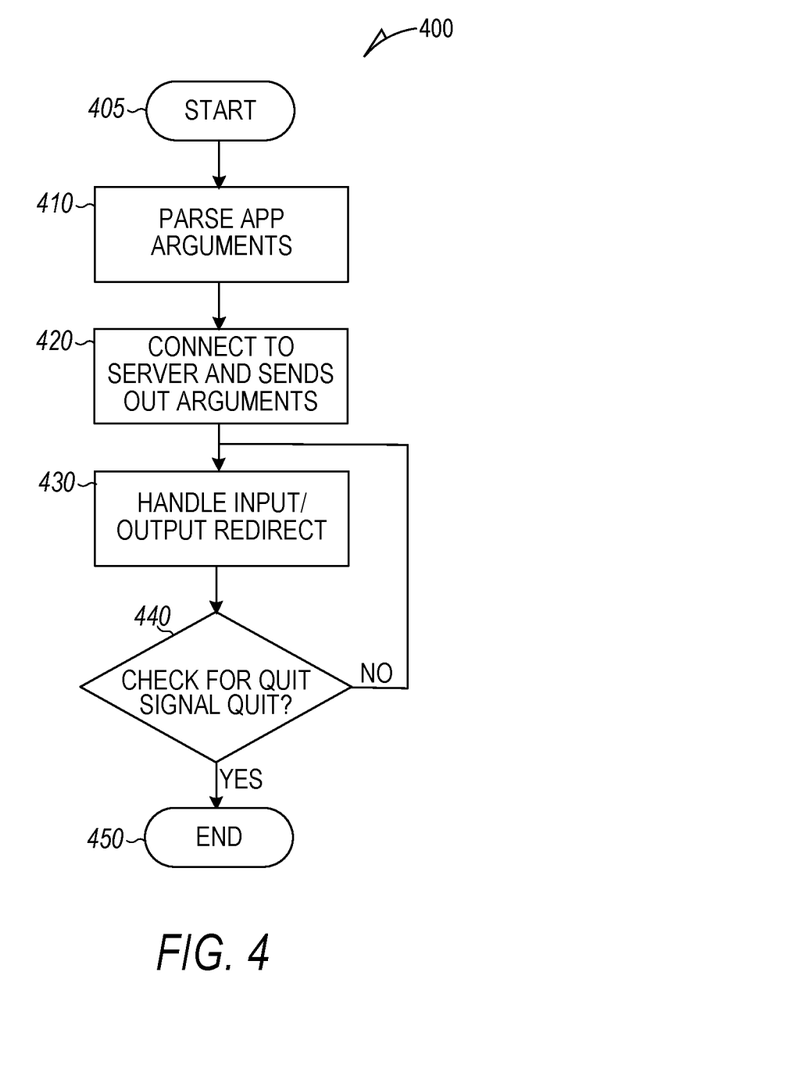
FIG. 4 is a flowchart illustrating a computer implemented method corresponding to thin client workflow inside a container according to an example embodiment.
Figure 5:
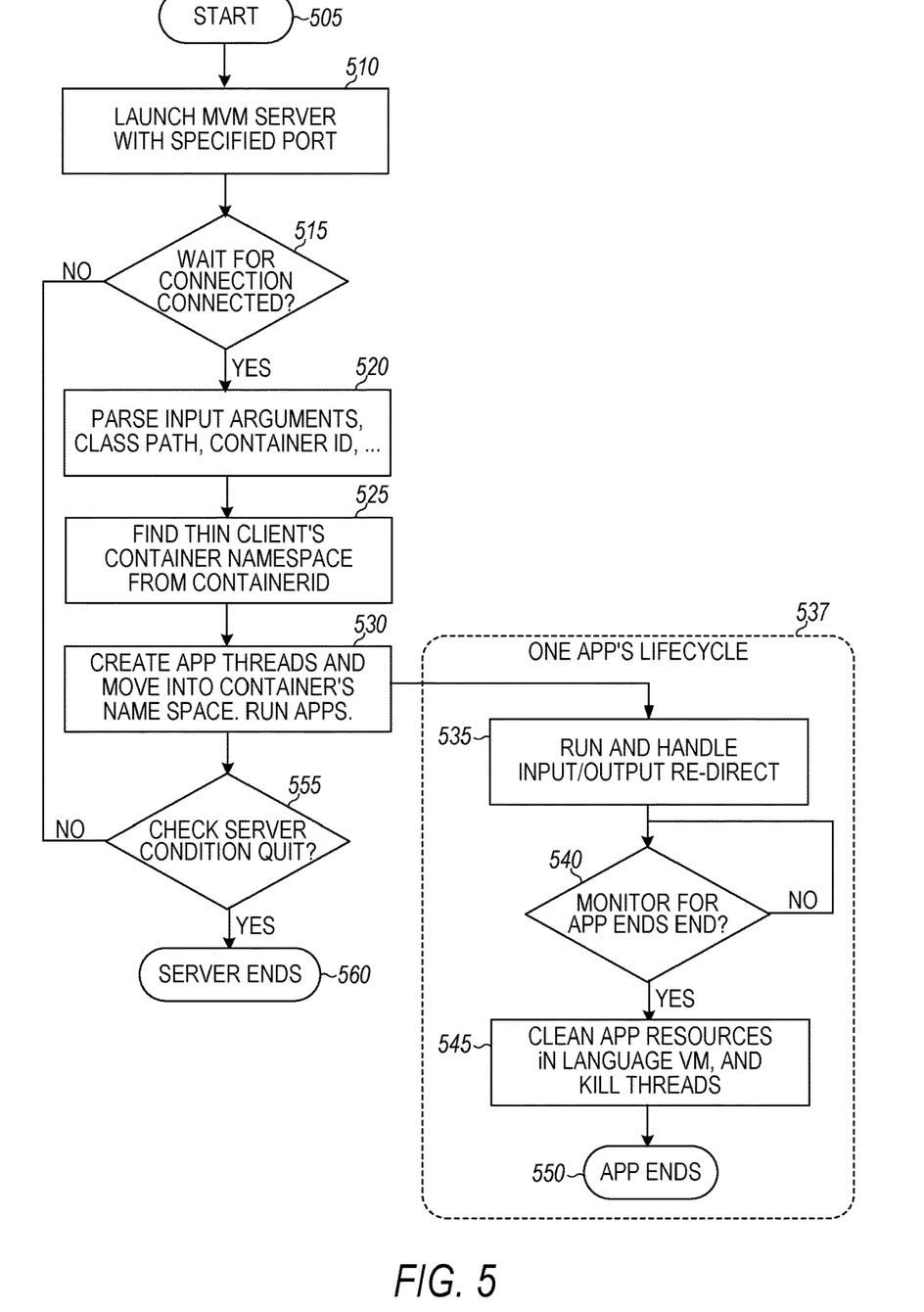
FIG. 5 is a flowchart illustrating a computer implemented method of multi-tenant virtual machine (MVM) server workflow in a host virtual machine according to an example embodiment.

FIG. 4 is a flowchart illustrating a computer implemented method 400 corresponding to thin client 230 workflow inside a container. FIG. 5 is a flowchart illustrating a computer implemented method 500 of MVM server 215 workflow in a host virtual machine. FIGS. 4 and 5 illustrate a detailed work flow of the thin client 230 and MVM server 215, and the interaction between each other. Description of the overall workflow below will move back and forth between the thin client workflow method 400 and the MVM server workflow method 500, with reference numbers beginning with the figure number to aid in following the flow between the depicted methods.

Method 400 begins with the launch of a container. For example, if a website that interacts with a user is first started up, one or more containers may be instantiated. The thin client in the container parses the application arguments, such as JAVA arguments, and obtains a container identifier (ID) at operation 410. In order for the MVM server to move application threads into the container's name space, the thin client must tell the MVM server the container ID. However, there is no direct way to get the container ID from inside the container. The container ID may be obtained in one embodiment by the thin client reading a "/proc/self/cgroup" file. For example, one line in the file is the container ID in the last section of this line (in bold) from the file:
11:name=systemd:/docker/
6a9df72d484d618dfe95ad705b141ee1711dbb1c718
676339e395cf0d5c87ba8

At operation 420, the thin client connects to and sends the ID to the MVM server 215.

Method 500 starts at 505 and launches the MVM server 215 with a specified port for communications at operation 510. At operation 515, MVM server 215 waits until the port is connected and the ID is received from the thin client operation 420. At operation 520, the MVM server 215 parses input arguments, a class path, the container ID and other information received. The thin client container name space is then derived from the container ID at operation 525. After the MVM server gets the container ID, method 500 can query the thin client's process ID in host OS through a container manager's API (e.g. Docker's API). After the process identifier (PID) of thin client, such as a JAVA thin client, is received, method 500 reads the host OS's "/proc/{PID}/ns/" file system to get the handles of different name spaces.

At operation 530, MVM server manager 310 creates application threads, such as JAVA threads, moves the threads into the container's name space, and runs the application. At operation 535, corresponding to an application's lifecycle delineated by broken line 537, the application is run and input/output re-direct is handled within the MVM server 215. Correspondingly, thin client 230 also handles input/output redirect at operation 430 as the application is run. Both methods 400 and 500 check to determine if the application is finished at operation 440, check for a quit signal, and operation 540, monitor for application end. In JAVA applications, the thin client 230 may use print(f) to output data to a computer's standard output. But the application runs in the MVM server, so the default output would be at the MVM server side. Thus, data needs to be redirected into the container. The input/output redirect operation 430 performs data exchange for both output and input.

In method 400, if the quit signal is not received, more input/output redirect is handled at operation 430 before checking again at operation 440 for the quit signal. Upon receipt of the quit signal at operation 440, method 400 ends at 450.

In response to method 400 ending, resources used by the application are cleaned in the MVM 210 and application threads are killed by the MVM server manager 310 at operation 545, signaling the end of the application lifecycle and ending at 550.

At operation 555, the MVM server 215 condition is checked. If no further applications are to be run, the server method 500 ends at 560. Otherwise, processing continues at operation 515, waiting for further connections.

In the MVM server 215, after the server processes all the arguments from the thin client, operation 530 creates a single entry thread as the application's managing thread. In one embodiment, the OS's "unshare(CLONE_NEWNS-|CLONE_NEWIPC|CLONE_NEWNET|CLONE-_NEWUTS|CLONE_FILES)" interface is used to unlink the thread from VM process' name space. The OS's "setns( )" API is used to add the thread into the container's net, uts, ipc, user, mnt name space. After that, the application itself may create more threads from the managing thread, and all these threads will inherit from the parent thread and are inside the container's name space.

In one embodiment, thin client 230 is a small native application living in the container 325, 330. The thin client 230 is also named as java so that the application can transparently replace the vanilla JAVA with thin client 230. Thin client 230 takes the command line parameters and does a quick check. If the MVM server 215 doesn't support some parameters, like JVMTI, the thin client 230 falls back to the original language VM inside the container 325, 330. Otherwise, the thin client 230 connects to the MVM server 215 and sends the parameters to the MVM server 230 to launch the application. After that, the thin client 230 forwards the thin client's stdin to the application's System.in, and forwards application's System.out and System.err to the thin client's stdout and stderr. The thin client 230 also hijacks the OS signals sent to the thin client 230, and forwards the OS signals to the MVM server 215. If the thin client 230 is killed by kill −9 or the container 325, 330 is directly closed, the MVM server 215 will see it as a timeout and kill the application directly.

The above communication between the thin client 230 and the MVM server 215 goes through a network socket. Because the thin client 230 and the MVM server 215 are in the same host OS 115, optimizations like interprocess communication (IPC) may alternatively be used.

The present embodiments can eliminate the need to manually change the code required by prior solutions, such as merging applications such as microservices into one monolithic program where port mapping is problematic due to potential port mapping conflicts unless the ports are changed by modifying microservice code. Some prior solutions created a problem in that applications outside a container cannot interact with other resources or an application inside the container.

Various embodiments of the present inventive subject matter transparently run applications inside a container into a Multi-tenant VM, allowing the container to interact with other applications and file systems, or other IO resources in the same container.

The use of containers for applications in an MVM system can also be applied to other language's MVMs. For example JAVAScript, Go, Python, etc. The approach also allows applications to be transparently run inside the container on top of the MVM in the host.

Figure 6:
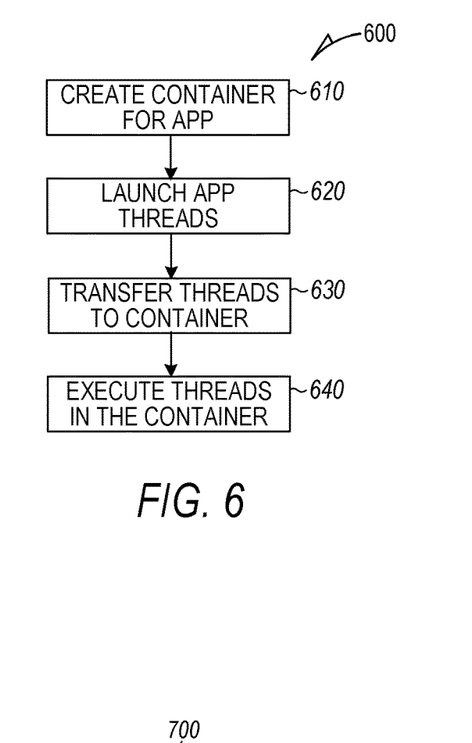
FIG. 6 is a flowchart illustrating a computer implemented method managing execution of applications within a memory space of an MVM according to an example embodiment.

FIG. 6 is a flowchart illustrating a computer implemented method 600 managing execution of applications within a memory space of an MVM. The applications may include microservices for one or more applications. Method 600 beings by instantiating a container for an application at operation 610. The container includes a thin client and has a name space that is part of a memory space of the MVM. At operation 620, if not already launched, method 600 launches threads for a first one of the applications within the MVM. The launched threads of the application are then moved at operation 630 from the MVM to the container. Moving the first thread launched threads comprises moving the first thread launched threads into the name space of the first container. The moved threads are then executed at operation 640 using the thin client in the name space of the container. Input/output redirect between the MVM and the thin client is handled.

In one embodiment, where the container for the launched threads is not already known, the thin client obtains a container ID and provides the container ID to the MVM. The MVM may derive the container name space based on the container ID.

In one embodiment, the MVM comprises a JAVA MVM. Transferring the first thread launched threads to the first container comprises transferring app jar files to the first container.

Multiple further applications may be handled by instantiating further containers using the MVM, each having a name space that is within a memory space of the MVM. Threads for the further applications may be launched within the MVM and transferred to and executed with the name spaces of the further containers.

Figure 7:
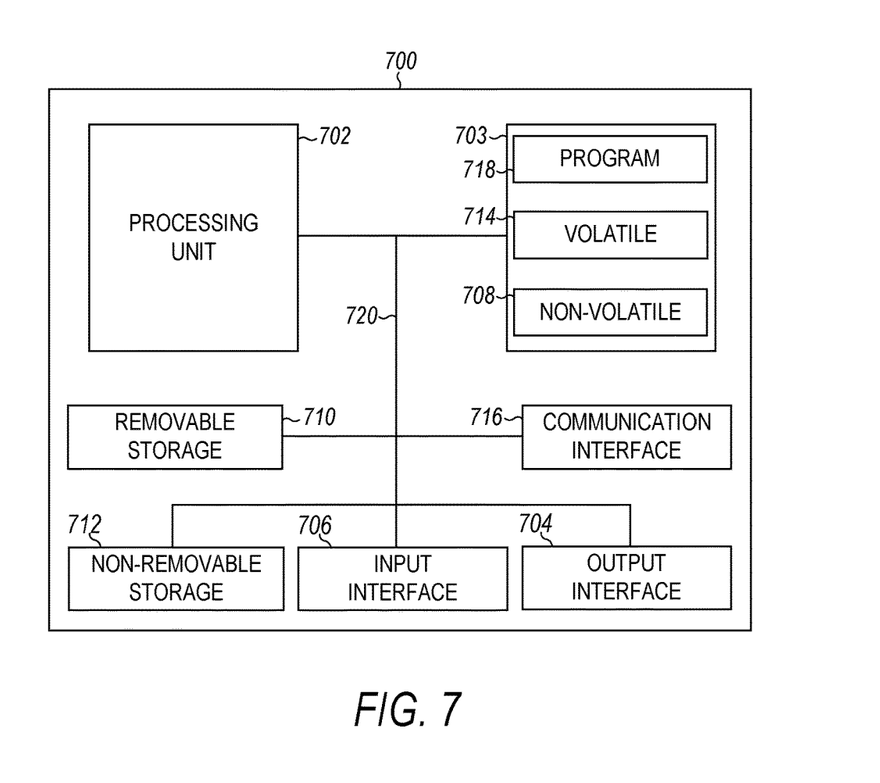
FIG. 7 is a block diagram illustrating circuitry for executing multiple applications in containers having a name space within an MVM memory space and performing methods according to example embodiments.

FIG. 7 is a block diagram illustrating circuitry for executing multiple applications in containers having a name space within an MVM memory space and performing methods according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, or other computing device including the same or similar elements as illustrated and described with regard to FIG. 7. Devices, such as smartphones, tablets, and smartwatches, are generally collectively referred to as mobile devices or user equipment. Further, although the various data storage elements are illustrated as part of the computer 700, the storage may also or alternatively include cloud-based storage accessible via a network, such as the Internet or server-based storage.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices.

The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software that, when executed by the processing unit 702, performs methods and algorithms associated with executing applications in containers according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 718 may be used to cause processing unit 702 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer implemented method for managing execution of applications within a memory space of a multi-tenant virtual machine (MVM), the method comprising:
    instantiating a container for an application, the container having a thin client and having a name space that is part of the memory space of the MVM;
    creating, by the MVM, an application thread for the application;
    moving the application thread from the MVM to the container; and
    executing the application thread using the thin client in the name space of the container, the application thread working with service threads executing in the MVM.

2. The method of claim 1 wherein operating system signals are forwarded by the thin client to the MVM.

3. The method of claim 1 wherein the thin client obtains a container ID and provides the container ID to the MVM.

4. The method of claim 3 wherein executing the application thread within the name space of the container includes handling input/output redirects between the MVM and the thin client.

5. The method of claim 3 wherein the MVM derives the container name space based on the container ID.

6. The method of claim 1 wherein moving the application thread comprises moving the application thread into the name space of the container.

7. The method of claim 1 wherein the MVM comprises a JAVA MVM and wherein moving the application thread to the container comprises transferring application jar files to the container.

8. The method of claim 1 further comprising:
instantiating a second container using the MVM, the second container having a name space within the memory space of the MVM;
launching a second application thread within the MVM, the second application thread being for a second application;
moving the second application thread to the second container; and
executing the second application thread within the name space of the second container.

9. The method of claim 8 further comprising:
instantiating a third container using the MVM, the third container having a third container name space that is within the memory space of the MVM;
launching a third application thread within the MVM, the third application thread being for a third application;
moving the third application thread to the third container; and
executing the third application thread within the third container name space of the third container.

10. The method of claim 9 wherein at least one of the first application, the second application, or the third application comprises microservices.

11. The method of claim 1 wherein the application thread comprises multiple application threads.

12. A device comprising:
a memory storage comprising instructions; and
one or more processors in communication with the memory storage, wherein the one or more processors execute the instructions to manage execution of applications within a memory space of a multi-tenant virtual machine (MVM) by performing operations comprising:
instantiating a container for an application, the container having a thin client and having a name space that is part of the memory space of the MVM;
creating, by the MVM an application thread for the application:
moving the application thread from the MVM to the container; and
executing the application thread using the thin client in the name space of the container, the application thread working with service threads executing in the MVM.

13. The device of claim 12 wherein operating system signals are forwarded by the thin client to the MVM.

14. The device of claim 12 wherein the thin client obtains a container ID and provides the container ID to the MVM, wherein the MVM derives the container name space based on the container ID, and wherein executing the application thread within the name space of the container includes handling input/output redirect between the MVM and the thin client.

15. The device of claim 12 further comprising:
instantiating a second container using the MVM, the second container having a name space within the memory space of the MVM;
launching a second application thread within the MVM, the second application thread being for a second application;
moving the second application thread to the second container; and
executing the second application thread within the name space of the second container.

16. The device of claim 12 wherein the MVM comprises a JAVA MVM and wherein moving the application thread to the container comprises transferring application jar files to the container.

17. The device of claim 15 wherein at least one of the first application or the second application comprises microservices.

18. The device of claim 12 wherein the application thread comprises multiple application threads.

19. A non-transitory computer-readable media storing computer instructions for managing execution of applications within a memory space of a multi-tenant virtual machine (MVM), that when executed by one or more processors, cause the one or more processors to perform operations comprising:
instantiating a container for an application, the container having a thin client and having a name space that is part of the memory space of the MVM;
creating, by the MVM, an application thread for the application;
moving the application thread from the MVM to the container; and
executing the application thread using the thin client in the name space of the container, the application thread working with service threads executing in the MVM.

20. The media of claim 19 wherein the thin client obtains a container ID and provides the container ID to the MVM, wherein the MVM derives the container name space based on the container ID, and wherein executing the application thread within the name space of the container includes handling input/output redirect between the MVM and the thin client.

21. The media of claim 19 and further comprising:
instantiating a second container using the MVM, the second container having a name space that is within the memory space of the MVM;
launching a second application thread within the MVM, the second application thread being for a second application;
moving the second application thread to the second container; and
executing the second application thread within the name space of the second container.

22. The media of claim 21 wherein at least one of the first application or the second application comprises microservices.

23. The media of claim 19 wherein the application thread comprises multiple application threads.

* * * * *

UNITED STATES PATENT AND TRADEMARK OFFICE
CERTIFICATE OF CORRECTION

PATENT NO. : 10,929,162 B2
APPLICATION NO. : 16/047273
DATED : February 23, 2021
INVENTOR(S) : Wang et al.

Page 1 of 1

It is certified that error appears in the above-identified patent and that said Letters Patent is hereby corrected as shown below:

In the Claims

In Column 11, Line 54, in Claim 12, delete "MVM" and insert --MVM,-- therefor

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*